6016X
E. Baker.
Cotton Picker.
Patented Jan. 4, 1830.
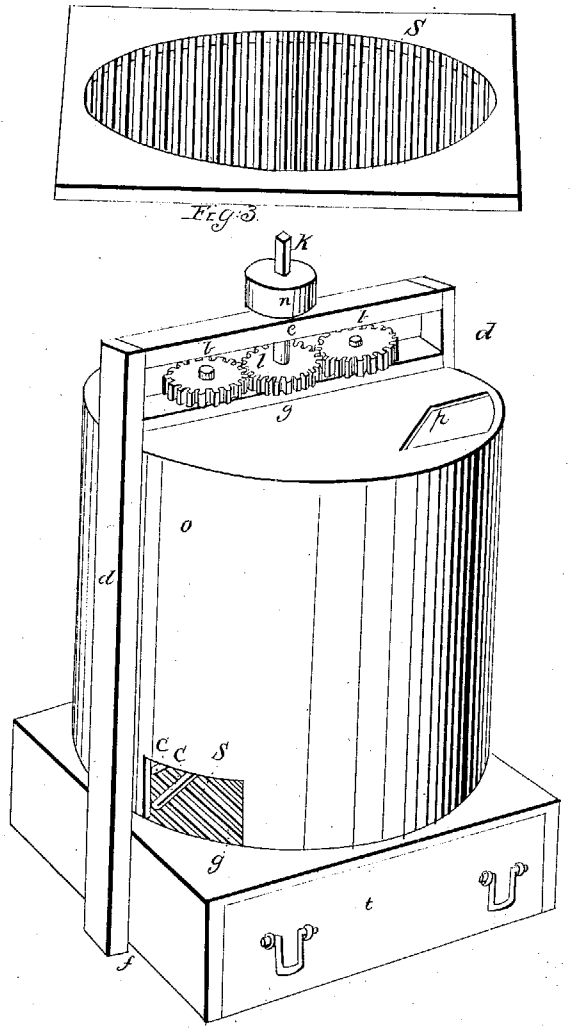
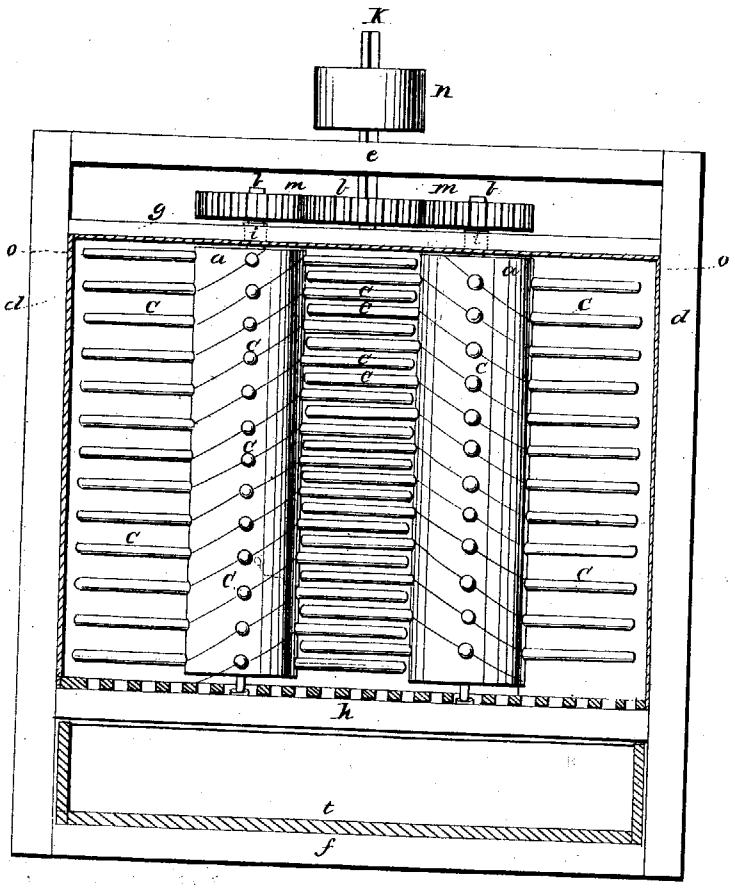

Elisha Baker
Letters Patent

The Schedule referred to in these Letters Patent and making
part of the same containing a description in the words of the said
Elisha Baker himself of his improvement called the Revolving Cotton
whipper.

The essential principle or plan or principle of the
Revolving Cotton Whipper, and which distinguishes it from the com
mon cotton whipper consists in the rotary motion and the ma-
chinery connected with this motion and especially constituting the
improvement, are two vertical cylinders placed near each other, each
cylinder being covered with projecting points, and these points be
ing so placed on the cylinders that when the cylinders revolve
the points on the respective cylinders will meet and pass each
other. The machinery is made of such materials as are com
monly used for like purposes and is secured to frame work is close-
ly enclosed in a casing or curb, and is put in motion by wa-
ter steam animal or other power at pleasure.
The different parts of the machinery embraced by this improve
ment are particularized as follows viz The parts which are first
put in motion, are the cylinder shafts. These shafts placed upright
or in a vertical position should be of iron, four feet more or
less in length, and of sufficient strength having one end pointed
and a spur cog wheel of suitable dimensions, attached to the other
or upper end. The shafts have each of them a bearing or journal
turned upon them, a few inches only from the cog wheel, and each
of these shafts is fixed longitudinally in the centre of a cylinder that
is three feet ~~more or~~ less in length and one foot more or less in
diameter. The pointed end of the shaft projecting a few inches
only from the cylinder. The cylinders may be of wood, they should
be of uniform diameter, and must be armed from one end to the
other with long projecting points, called whipping sticks which ought
to be of iron steel or other strong material. The whipping sticks

[illegible]

X 6016 should be round and smooth, and they must be firmly secured by
one end to the cylinders from which they may project somewhere
about twelve or eighteen inches, and their direction must be horizon-
tal or at right angles with the surface of the cylinders. There may
be more or less of these whipping sticks at pleasure in each cylinder,
but when inserting these sticks care should be taken to place them
in a spiral direction around the cylinder from one end to the
other of it, and they must be placed at such distance from
each other, as to leave around the cylinder, a horizontal space
rather more than equal to the size of one of the sticks. This
may be accomplished by marking around the cylinder fourteen,
more or less, horizontal circles, at equal distances from each oth-
er, taking care that the space between the circles, shall be rather lar-
ger than a whipping stick, then insert a whipping stick in
every other circle on the one cylinder, and in the corresponding
intermediate circles on the other cylinder, observing to place the
whipping sticks spirally, from one end to the other of the
cylinder. The cylinder shafts complete with gear, cylinders &
whipping sticks are to be stationed by the side of, parallel
with, and so near to each other that the points of the whip-
ping sticks on the one cylinder will nearly touch the other
cylinder itself. The shafts are to be kept in this position by a
frame of wood or other material. The frame is composed of
several pieces well secured to each other, two of which are call-
ed the upright posts. The upright posts stand perpendicu-
larly on the floor of the building are six or eight feet high, and
stationed at the proper distance, say four feet, more or less,
from each other, and they are confined to each other by cross
pieces which extend from the one to the other post, and these
pieces are called girts. The girts are four or less in num-
ber, one is at the top end of the posts, another is at the bot-
tom end of the posts and the remaining two girts being the
most important ones are fixed nearer the centre of the po

X6016 within the other girts and correspond in distance from each other with the
points and journals of the cylinder shafts. The upper girt is called the top
girt and the next girt is called the middle girt. the girt below that is
called the step girt and the remaining girt is called the bottom girt. At the prop-
er places in the middle girt are secured metallic or other boxes for the
reception of the necks or bearings of the cylinder shafts and at correspond-
ing places on the step girt are secured the steps (made of metal or oth-
er appropriate substance) for the reception of the pointed ends of the
cylinder shafts. The Boxes and steps keep the cylinder shafts in their
relative positions, and at the same time should permit them to revolve
freely on their axis. The cylinder shafts are to be put in motion by
a third shaft having a cog wheel on one end of it which cog wheel
is called the first wheel, and fits the cog wheels on the cylinder shafts.
The third shaft is called the driving shaft, and it is secured to the top
girt, and to the middle girt and is stationed between the cog wheels of
the cylinder shafts having its cog wheels playing in the cog wheels of
the cylinder shafts. A pulley is secured on the other or upper end of the
driving shaft and is called the driving pulley. a casing of wood tin or oth-
er suitable substance surrounds the two cylinders. This casing is called the
curb. The curb has a small opening at the top of it through which the
cotton is put to enter among the whipping sticks. The Curb has also an
opening at the lower part of it, on one side, where the cotton after it is whip-
ped comes out. At the bottom of this curb are grates of wood which form
the flooring of the curb. Through these grates the dirt from the Cotton
falls into the drawer. The drawer is as large as the bottom end of
the curb. it occupies the space between the step girt and the bottom, and
is made to be taken out at pleasure by rings knobs or handles fixed on
its front side. The operation of the revolving cotton whipper is as follows
viz power being applied by means of a belt to the pulley on the driving
shaft. the two cylinders are put in motion. The cotton is introduc-
ed among the whipping sticks through the hole in the top of the curb
and the extremely rapid motion of the whipping sticks very soon whips
[illegible] the cotton [illegible] & [illegible] it through the opening at the bottom part of the curb. [illegible]

Witnesses { Wm [illegible]
{ John [illegible]
Elisha Parker. [illegible]
([illegible])